United States Patent
Benz

(10) Patent No.: US 10,087,977 B2
(45) Date of Patent: Oct. 2, 2018

(54) DOUBLE NUT

(71) Applicant: Neumayer Tekfor Engineering GmbH, Hausach (DE)

(72) Inventor: Tim Benz, Hausach (DE)

(73) Assignee: Neumayer Tekfor Engineering GmbH, Hausach (DE)

( * ) Notice: Subject to any disclaimer, the term of this patent is extended or adjusted under 35 U.S.C. 154(b) by 0 days.

(21) Appl. No.: 15/185,353

(22) Filed: Jun. 17, 2016

(65) Prior Publication Data

US 2016/0369831 A1 Dec. 22, 2016

(30) Foreign Application Priority Data

Jun. 20, 2015 (DE) .................. 10 2015 007 916

(51) Int. Cl.
*F16B 39/12* (2006.01)
*F16B 37/00* (2006.01)

(52) U.S. Cl.
CPC .............. *F16B 39/12* (2013.01); *F16B 37/00* (2013.01); *F16B 39/122* (2013.01)

(58) Field of Classification Search
CPC ........ F16B 37/00; F16B 39/12; F16B 39/122; F16B 39/124; F16B 39/282; F16B 39/283; F16B 39/34
USPC ....... 411/222, 223, 225, 229, 237, 239, 280, 411/431, 432
See application file for complete search history.

(56) References Cited

U.S. PATENT DOCUMENTS

| 748,882 | A | | 1/1904 | Peters et al. | |
|---|---|---|---|---|---|
| 1,093,050 | A | | 4/1914 | Heckel | |
| 1,606,941 | A | | 11/1926 | Holman | |
| 2,285,345 | A | * | 6/1942 | Miller | F16B 39/122 411/238 |
| 2,374,266 | A | * | 4/1945 | Barr | F16B 39/128 411/239 |
| 2,518,469 | A | | 8/1950 | Harding | |
| 4,729,703 | A | * | 3/1988 | Sato | F16B 31/021 411/237 |
| 4,826,376 | A | * | 5/1989 | Aldridge | B21K 1/707 411/237 |

(Continued)

FOREIGN PATENT DOCUMENTS

| DE | 838 840 | 5/1952 |
|---|---|---|
| JP | 2011-17352 A | 1/2011 |
| WO | WO 2009/104767 A1 | 8/2009 |

OTHER PUBLICATIONS

German Search Report issued in counterpart German Application No. 10 2015 007 916.6 dated Mar. 10, 2016, with partial English translation (twelve (12) pages).

*Primary Examiner* — Roberta S Delisle
(74) *Attorney, Agent, or Firm* — Crowell & Moring LLP

(57) ABSTRACT

A double nut is provided in which a flange nut and an insert nut are coupled. The flange nut has a longitudinal axis and has, in an end region facing the insert nut, a stop surface and a wall surface. The insert nut has a longitudinal axis and has at least one snap element in an end region facing the flange nut. The stop surface extends over the at least one snap element radially in the direction of the longitudinal axis of the flange nut. The flange nut has a guide surface in the end region facing the insert nut which is disposed closer to the longitudinal axis of the flange nut than the wall surface.

6 Claims, 2 Drawing Sheets

(56) References Cited

U.S. PATENT DOCUMENTS

| | | | | |
|---|---|---|---|---|
| 6,554,555 | B2 * | 4/2003 | Imahigashi | H01Q 1/1214 411/149 |
| 7,014,404 | B2 * | 3/2006 | Chiang | F16B 31/02 411/184 |
| 7,326,017 | B2 * | 2/2008 | Winker | F16B 37/00 411/533 |
| 7,437,976 | B1 * | 10/2008 | Goldbaum | F16B 37/085 411/237 |
| 8,100,617 | B2 * | 1/2012 | Cymbal | B62D 1/184 411/2 |
| 2003/0031531 | A1 | 2/2003 | Aldridge | |
| 2015/0308487 | A1 | 10/2015 | Michiwaki | |

* cited by examiner

DOUBLE NUT

CROSS REFERENCE TO RELATED APPLICATIONS

This application claims priority under 35 U.S.C. § 119 from German Patent Application No. 10 2015 007 916.6, filed Jun. 20, 2015, the entire disclosure of which is herein expressly incorporated by reference.

BACKGROUND AND SUMMARY OF THE INVENTION

The invention relates to a double nut comprising a flange nut and an insert nut.

In the invention the flange nut has a longitudinal axis, at least one stop in an end region facing the insert nut, surface and a wall surface adjoining the stop surface. Furthermore, the insert nut has a longitudinal axis and has at least one snap element in an end region facing the flange nut. The stop surface extends at least partially over the at least one snap element radially in the direction of the longitudinal axis of the flange nut.

Double nuts consist of two nuts, which in some embodiments have different internal threads and can be fastened individually. Such double nuts enable, for example, the connection of two shafts or the fastening of a shaft to an element comprising at least one stub. In this case one nut—designated hereafter as an insert nut—is introduced at least partially into the other nut—designated hereafter as a flange nut—and is generally retained there so that it cannot fall out.

A double nut is disclosed for example by German patent document no. DE 838 840. In the region of the insert nut which faces and is at least partially introduced into the flange nut, the insert nut has cutouts, so that a plurality of snap elements are produced. Moreover, on the end region of the flange nut facing the insert nut an edge is configured as a stop surface which retains the insert nut.

Difficulties with double nuts generally lie in the manufacture and—conversely—in the demounting of the nuts from the installed state, that is to say the release of the two nuts. The problem is precisely that the flange nut extends over the insert nut. Therefore, the insert nut must be introduced during manufacture and removed again during demounting.

The objective underlying the invention therefore consists of providing a double nut which allows the simplest possible manufacture which as a result is secure and reliable.

The double nut according to the invention, in which the objective set out above is achieved, is essentially characterized in that the flange nut has a guide surface in the end region facing the insert nut, wherein the guide surface is disposed at least partially closer to the longitudinal axis of the flange nut than the wall surface.

Thus, the flange nut of the double nut according to the invention has a guide surface which is located radially further inward than the wall surface which adjoins the stop surface.

In one embodiment the guide surface begins along the longitudinal axis of the flange nut at a level which—viewed from the insert nut—is located behind the level of the stop surface. Thus, in this embodiment the guide surface for the insert nut is located below the region in which the stop surface extends over the snap element or in which the stop surface and the snap element overlap.

In general, a space inside the flange nut, into which the insert nut is introduced using the at least one snap element, is at least partially surrounded by the guide surface in conjunction at least with the stop surface and the wall surface adjoining it—and optionally by at least one further surface.

If the flange nut is delimited by an inner cutout, which is delimited at least partially by the stop surface and the wall surface adjoining it, a space inside this inner cutout is delimited separately by the guide surface. Therefore, in one embodiment it is provided that the guide surface is not disposed radially further in the inner cutout than an internal diameter which is to be defined by the flange nut and in particular is produced by an internal thread to be realized.

The purpose of the guide surface is in particular to guide the snap element or, if applicable, the snap elements, and thus—preferably by the introduction of the insert nut into the flange nut—to influence at least one movement component of the snap element or the snap elements. Therefore, the snap element or the snap elements is or are guided by the guide surface during the introduction of the insert nut. This preferably takes place radially outward.

In one embodiment the at least one snap element is located between the stop surface, the wall surface and the guide surface.

In one embodiment it is provided that the flange nut has an internal thread. In this case in one embodiment the guide surface is in particular configured in such a way that it does not protrude into the internal thread. Alternatively or additionally the guide surface forms a component of the internal thread, and in this respect an element of the flange nut partially forms the guide surface and partially forms the internal thread.

In an additional or alternative embodiment, a main body of the insert nut and the at least one snap element in each case have an internal thread. In this case the main body is the actual body of the insert nut which is adjoined by the at least one snap element or a plurality of snap elements.

Alternatively, only the main body of the insert nut has an internal thread and the snap element adjacent thereto has no internal thread.

In one embodiment the main body of the insert nut and the snap element or the snap elements have differently configured internal threads. Thus, in one embodiment the main body of the insert nut has a cylindrical internal thread and the at least one snap element has a conical internal thread.

According to one embodiment the guide surface and the at least one snap element are configured and coordinated with one another in such a way that the guide surface guides the snap element radially away from the longitudinal axis as the insert nut is introduced into the flange nut. If the insert nut is introduced into the flange nut in one direction—in particular along the longitudinal axis of the flange nut and/or of the insert nut—the at least one snap element is guided away laterally outward by the guide surface. Thus, if for example an end region of the snap element for the introduction of the insert nut into the flange nut is located radially inward, this end region is directed radially outward by the guide surface, so that this also again results in the stop surface reliably extending over the snap element and therefore the insert nut is retained by the flange nut.

In one embodiment it is provided that the guide surface on an end face facing the insert nut is close to the longitudinal axis of the flange nut and is distant from the longitudinal axis in the direction of a foot face facing away from the insert nut. In this embodiment the guide surface is configured so that it is inclined radially outward, so that also the snap element, when it comes into contact with the guide surface, is guided outward the further the insert nut and thus the snap element is introduced into the flange nut.

Therefore, in one embodiment it is in particular provided that the guide surface widens conically outward along the longitudinal axis of the flange nut.

In one embodiment the at least one snap element is designed in such a way that it is at least in part resiliently deformable radially relative to the longitudinal axis of the insert nut. The at least one snap element is—or, in the case of an embodiment with a plurality of snap elements, the snap elements are—preferably configured in such a way that it adjoins the main body of the insert nut and that it is preferably resiliently deformable in the connection region or the transition region. In this case the deformability in particular causes a radial movement of the snap element or of the snap elements, and in this respect the snap element or the snap elements can be bent radially inward or outward.

If the snap element or the snap elements is/are bent inward, it is for example possible to introduce the insert nut into the flange nut or to remove the insert nut again from the flange nut. The resilient deformability has the advantage that the snap element or the snap elements again return to the original shape. This is advantageous in particular when the insert nut is introduced into the flange nut.

Thus, during manufacture, at the outset the at least one snap element is preferably pressed radially inward and the insert nut is—for example by simultaneous application of a force onto the snap element—introduced into the flange nut. If the snap element is located at least with a substantial part behind the stop surface and the force on the snap element is cancelled, the snap element returns to its original shape and preferably moves into the region between the stop surface and the adjoining wall surface and thus radially outward from the guide surface.

In an alternative or optionally additional embodiment the at least one snap element is, at least in part, inclined in the direction of the longitudinal axis of the insert nut. Thus in this embodiment the snap element is plastically deformed radially inward, at least in part. During use of the double nut, such a plastic deformation is preferably compensated for by the carrier of the external thread on which the insert nut is mounted or screwed, as this carrier—for example a shaft—presses the snap element radially outward and thus against the direction of the plastic deformation.

In one embodiment the at least one snap element is partially plastically radially deformed and moreover can be resiliently deformed, at least in part.

In one embodiment the insert nut has a plurality of snap elements which are distributed uniformly over the circumference of the insert nut. The more snap elements are provided, the more the retaining force acting between the flange nut and the insert nut is distributed.

For the introduction of the insert nut into the flange nut, in one embodiment it is provided that the at least one snap element has a foot surface and that the foot surface and the stop surface are configured so as to correspond to one another. The foot surface, as the outer face of the snap element lying opposite the face of the snap element which comes into contact with the guide surface, and the corresponding stop surface are preferably configured so that during introduction a sliding relative movement between the snap element and the stop surface is made possible.

In one embodiment the foot surface is in particular of conical configuration.

In one embodiment the foot surface and the associated portion of the stop surface are configured so as to correspond to one another in such a way that the stop surface extends radially in the direction of the longitudinal axis, starting from the wall surface, substantially at an angle of 90°. Accordingly, the foot surface preferably likewise has a portion which is substantially planar and preferably extends radially outward at an angle of 90°.

In alternative or supplementary embodiments, other combinations of rear or front undercuts are provided.

In a further embodiment the stop surface is produced in that, after the introduction of the insert nut into the flange nut, the region of the insert nut facing the flange nut is flanged over, thus providing sufficient overlap between the stop surface and the foot surface. However, the stop surface can also be produced by a flanging process, without the preceding introduction of the insert nut.

In one embodiment the stop surface opens radially—and in particular conically—outward away from the direction of the insert nut. Accordingly, in this embodiment the foot surface of the snap element or of the snap elements is likewise provided with a cone extending radially outward preferably at the same angle of inclination.

In an alternative embodiment the stop surface has a groove in which the snap element engages appropriately.

In one embodiment the guide surface has a rotationally symmetrical configuration.

In additional embodiments the flange nut and/or the insert nut are of substantially rotationally symmetrical configuration.

In one embodiment the rotational symmetry of the insert nut is interrupted by the provision of an odd number of snap elements. However, in one embodiment the main body of the insert nut is also rotationally symmetrical.

In one embodiment the insert nut and/or the flange nut has or have at least partially flattened outer faces, in order to facilitate or to simplify the tightening by corresponding tools.

Other objects, advantages and novel features of the present invention will become apparent from the following detailed description of one or more preferred embodiments when considered in conjunction with the accompanying drawings.

DETAILED DESCRIPTION

Figure 1:
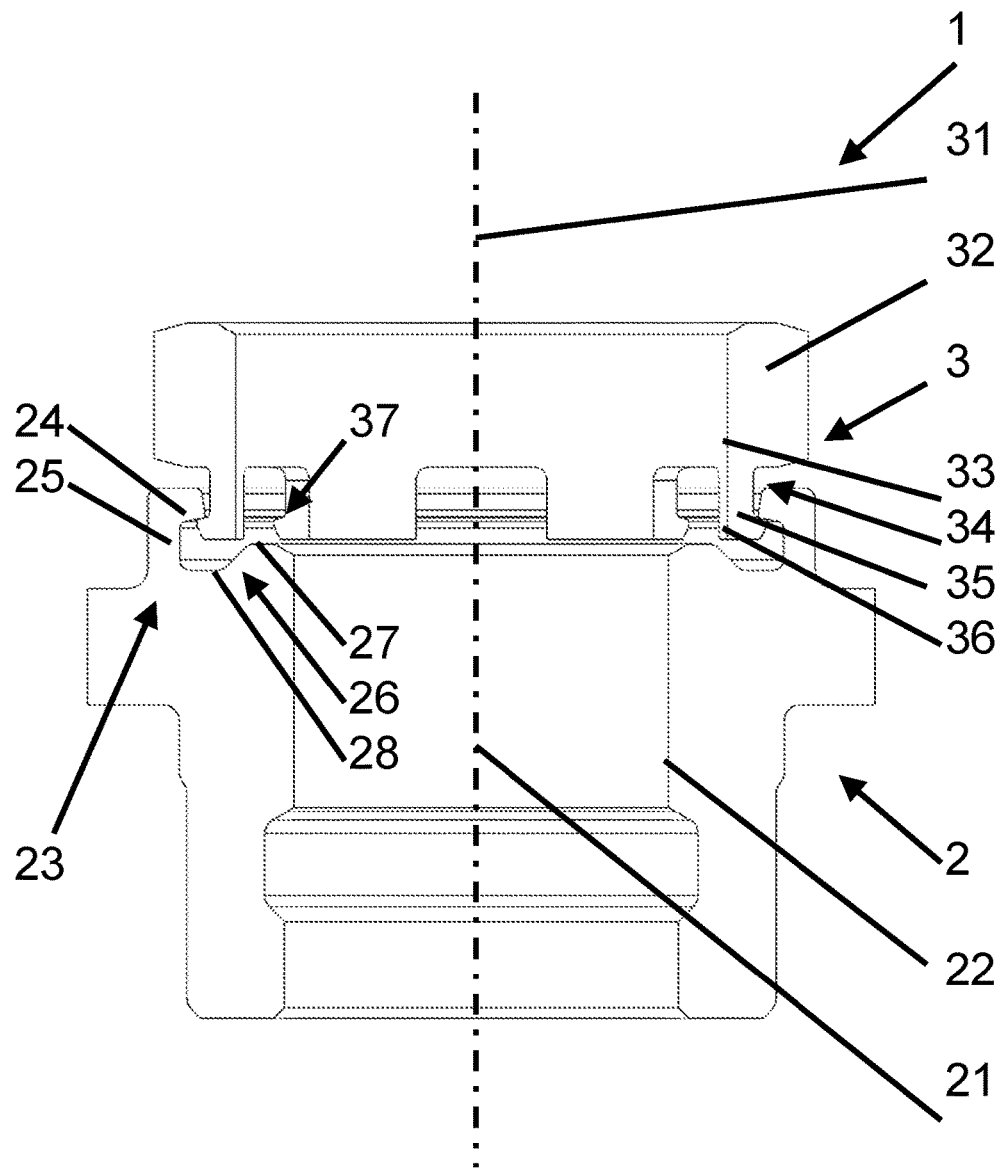
FIG. 1 shows a section through a double nut according to an embodiment of the invention.

The embodiment of the double nut 1 of FIG. 1 includes a flange nut 2, in which the insert nut 3 is partially introduced.

In this case the flange nut 2 has a continuous cutout around a longitudinal axis 21 with an internal thread 22. The stop surface 24, with which the flange nut 2 extends over the insert nut 3 and retains the insert nut 3 by the overlap, is located at the end region 23 of the flange nut 2 which faces the insert nut 3.

A wall surface 25 which extends substantially parallel to the longitudinal axis 21 adjoins the stop surface 24.

The guide surface 26, which has a conical widening away from the insert nut 3, is located radially further inside and thus closer to the longitudinal axis 21. The guide surface 26 is located with an end face 27 along the longitudinal axis 21, as seen from the insert nut 3 below the stop surface 24, and with the foot face 28 further away radially outward from the longitudinal axis 21.

A further portion, which protrudes radially outward here at a height along the longitudinal axis 21, is located between the foot face 28 and the wall surface 25.

Overall a defined region is produced in the inner cutout of the flange nut 2.

The radially inner face of the part of the flange nut 2 which supports the guide surface 26 also forms a portion of the internal thread 22 here.

The insert nut 3 likewise has a longitudinal axis 31 which here coincides with the longitudinal axis 21 of the flange nut 2. Furthermore, a main body 32 is provided which also carries the internal thread 33. In the end region 34 a plurality of snap elements 35 are provided, which likewise have an internal thread 36 here.

The snap elements 35 in each case have a foot face 37, which are directed radially outward here, so that an overlap between snap element 35 and stop surface 24 is produced which in turn ensures that the insert nut 3 cannot fall out of the flange nut 2.

Figure 2:
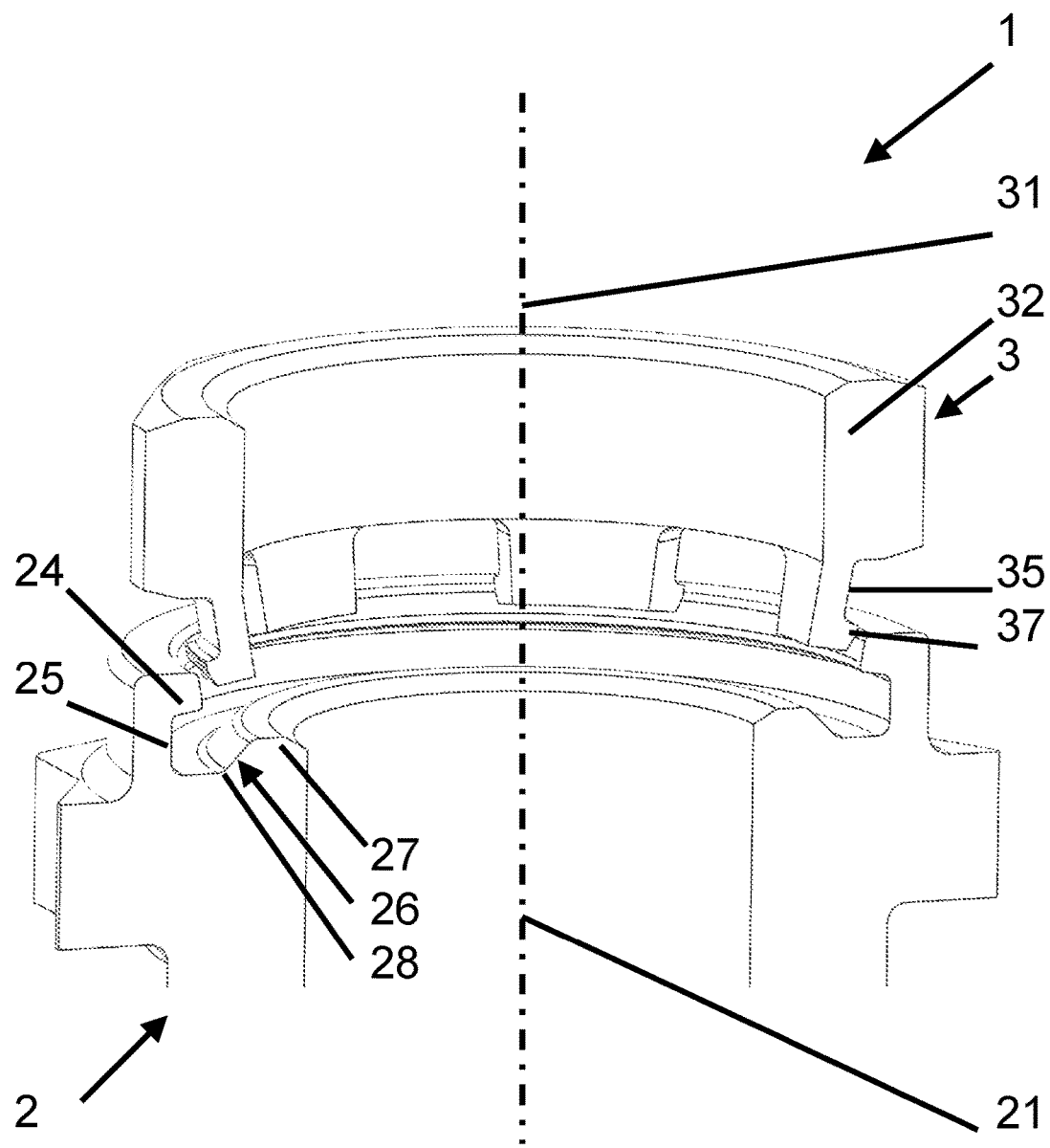
FIG. 2 shows a section through the double nut of FIG. 1 during manufacture.

The effect of the guide surface 26 is described with reference to FIG. 2, which shows the double nut 1 during manufacture.

For the introduction of the insert nut 3 into the flange nut 2 the snap elements 35 are resiliently bent radially in the direction of the longitudinal axis 31, i.e. when the force no longer acts the snap elements 35 return to their preceding and original form. The bending also occurs here in particular in the region of the transition from the main body 32 to the snap elements 35. Due to the bending the foot faces 37 project outward less and have in particular a smaller external diameter than the stop surface 24 of the flange nut 2.

The guide surface 26 is provided in order to simplify the fitting of the insert nut 3 into the flange nut 2 and in order to reliably enforce the radial original position. Since the guide surface 26 widens outward with the depth, the snap elements 35 are moved outward by the introduction of the insert nut 3 into the flange nut 2 and therefore below the radially surrounding stop surface 24.

Overall the stop surface 24, the wall surface 25, the connection to the foot face 28 of the guide surface as well as the guide surface 26 itself form an inner space within the inner cutout of the flange nut 2, into which the snap elements 35 are introduced by means of the resilient deformation radially in the direction of the longitudinal axis 21 of the flange nut 2 or the longitudinal axis 31 of the insert nut 3.

The effect of the guide surface 26 with the conical widening is that a force by which the insert nut 3 is introduced into the flange nut 2 has a force component onto the snap element 35 in the radial direction and thus the snap elements 35 are pressed outward.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A double nut, comprising:
   a flange nut having a flange nut longitudinal axis; and
   an insert nut having an insert nut longitudinal axis,
   wherein
   the flange nut includes in an end region facing the insert nut a stop surface, a wall surface adjoining the stop surface, and a guide surface,
   the insert nut includes a plurality of snap elements in an end region facing the flange nut, each snap element of the plurality of snap elements is at least in part resiliently deformable radially,
   the stop surface extends at least partially over the snap elements of the plurality of snap elements radially in the direction of the longitudinal axis of the flange nut, producing an overlap to retain the insert nut in the flange nut,
   the guide surface is at least partially closer to the longitudinal axis of the flange nut than the wall surface,
   the guide surface at a guide surface end facing the insert nut is radially closer to the longitudinal axis of the flange nut than a guide surface end facing axially away from the insert nut, and
   the guide surface and the snap elements of the plurality of snap elements are configured to cooperate such that as the insert nut is introduced into the flange nut, the guide surface guides the snap elements radially away from the longitudinal axis of the flange nut into a space between the wall surface and the guide surface radially overlapped by the stop surface.

2. The double nut according to claim 1, wherein
   each snap element of the plurality of snap elements is at least in part inclined radially toward the longitudinal axis of the insert nut.

3. The double nut according to claim 1, wherein
   each snap element of the plurality of snap elements includes a foot surface configured to cooperate with the stop surface of the flange nut to retain the insert nut in the flange nut.

4. The double nut according to claim 1, wherein
   the guide surface is rotationally symmetrical.

5. The double nut according to claim 1, wherein
   the flange nut includes an internal thread.

6. The double nut according to claim 5, wherein
   the insert nut has an internal thread in a main body portion, and
   the at least one snap element includes a conical internal thread.

* * * * *